United States Patent [19]
Curran

[11] Patent Number: 5,922,419
[45] Date of Patent: Jul. 13, 1999

[54] HOT PLATE WITH IMAGE DISPLAY

[76] Inventor: Terrance G. Curran, 27 Bayview St., Yarmouth, Me. 04096

[21] Appl. No.: 08/824,247

[22] Filed: Mar. 25, 1997

Related U.S. Application Data

[60] Provisional application No. 60/014,074, Mar. 26, 1996.
[51] Int. Cl.⁶ .............................. B32B 17/00; B44F 1/00
[52] U.S. Cl. ................................ 428/13; 156/60; 428/46; 428/195
[58] Field of Search ................................ 428/13, 14, 46, 428/195; 156/60

[56] References Cited

U.S. PATENT DOCUMENTS

| | | | |
|---|---|---|---|
| 4,337,109 | 6/1982 | Narita | 428/13 X |
| 4,378,397 | 3/1983 | Sussman | 428/36.5 X |
| 4,774,143 | 9/1988 | Gondela et al. | 428/51 X |
| 5,098,760 | 3/1992 | Fletcher | 428/46 |
| 5,424,141 | 6/1995 | Croner | 428/19.5 |
| 5,433,980 | 7/1995 | Auld et al. | 428/13 |
| 5,443,869 | 8/1995 | Harris | 428/13 |
| 5,447,760 | 9/1995 | Watras | 428/13 |
| 5,458,930 | 10/1995 | Brown | 428/13 X |

*Primary Examiner*—Henry F. Epstein
*Attorney, Agent, or Firm*—Smith, Gambrell & Russell; Beveridge, DeGrandi, Weilacher & Young Intellectual Property Group

[57] ABSTRACT

A hot plate assembly for supporting heated elements above a more heat susceptible surface, while also presenting an image through the translucent or transparent top plate of the hot plate assembly. The transparent or translucent top plate or main body is preferably formed of a tempered glass and a photographic element or other manner of illustrating an object is mounted or positioned on the undersurface of the top plate so as to be visible through the top plate. The image member provided on the undersurface of the top plate is fixed in position by way of a larger area backing layer which is bonded at least to the top plate's undersurface but also to the image member such as a photograph. Alternatively, the backing layer has the image integrally formed on or in the backing layer. A method is also described for forming a hot plate assembly which includes the sandwiching of the image member between the top plate and backing layer. The image member is in one embodiment on ink, paint or the like depiction formed on the top plate's undersurface and covered by the backing layer. The image member preferably occupies a majority of the underlying surface. The image member can also originate from a scanned original in an automated application of the image member to the top plate.

20 Claims, 4 Drawing Sheets

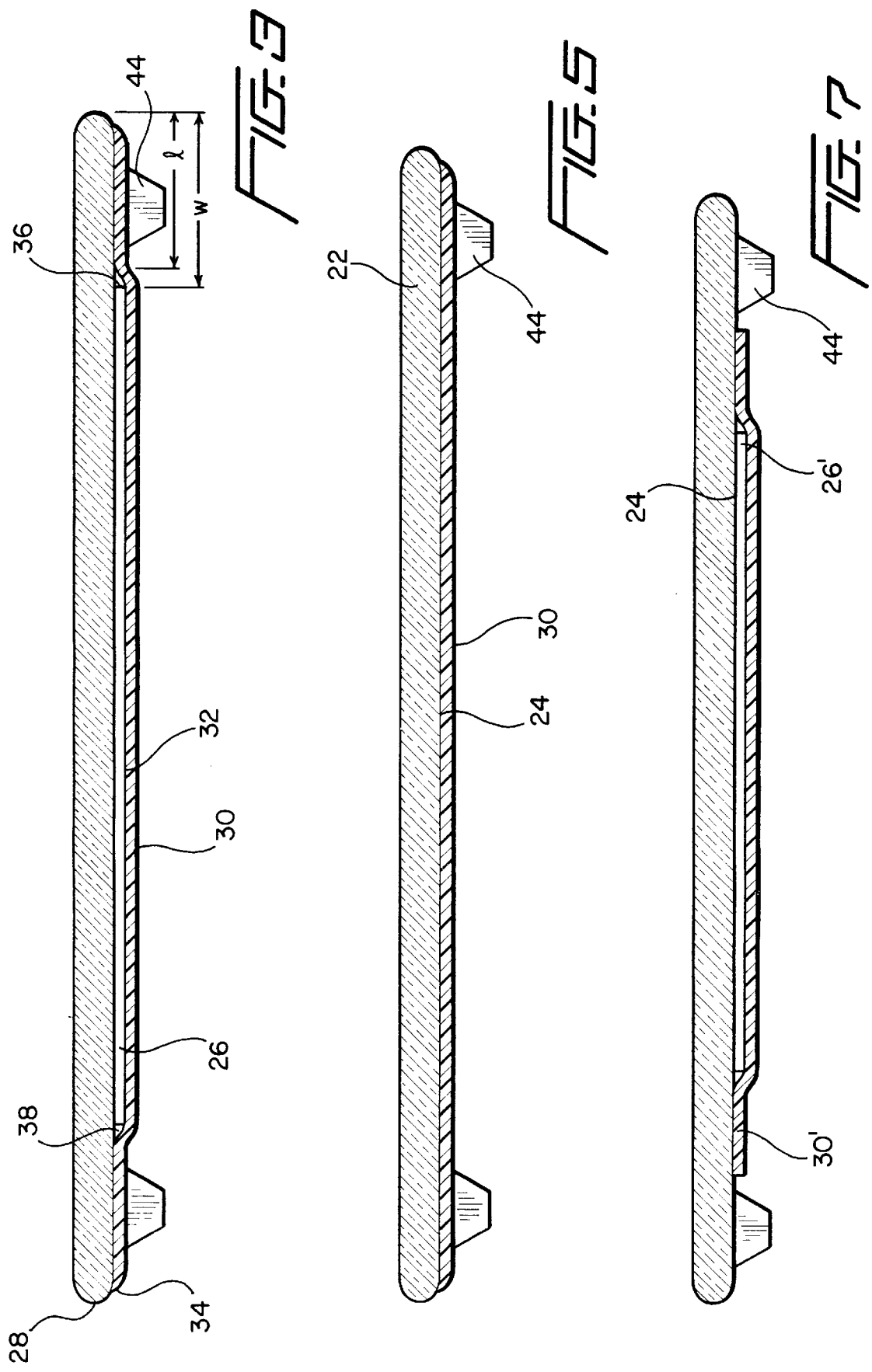

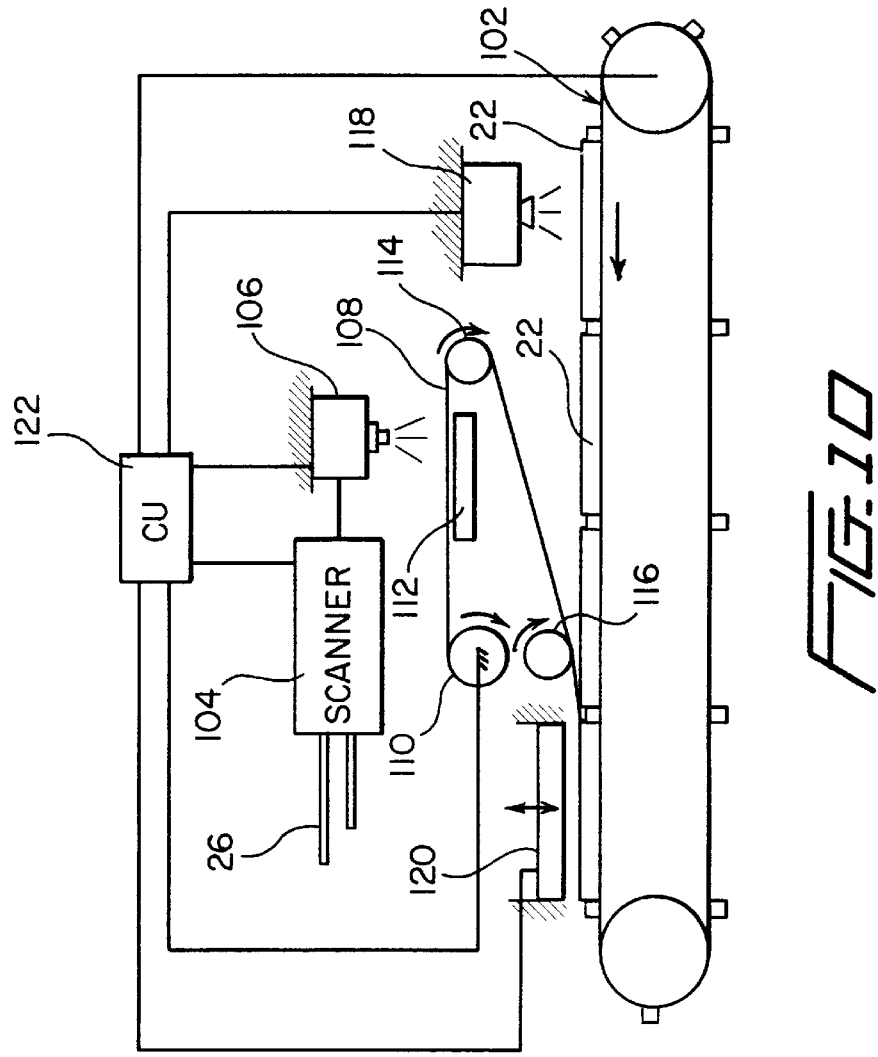
FIG. 10
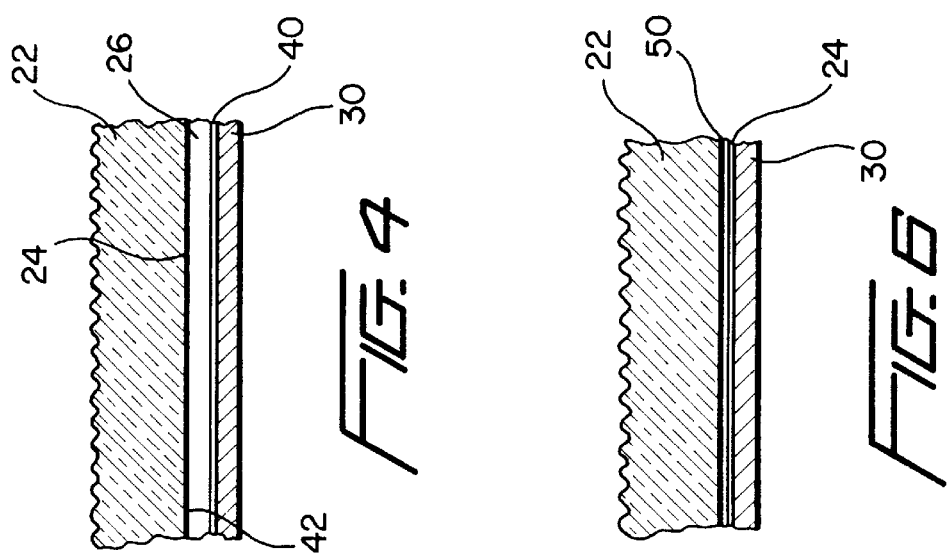
FIG. 4
FIG. 6

HOT PLATE WITH IMAGE DISPLAY

CROSS-REFERENCED TO RELATED APPLICATIONS

This application claims priority under 35 U.S.C. § 119 (e) of provisional patent application 60/014,074, filed Mar. 26, 1996 and entitled HOT PLATE WITH IMAGE DISPLAY. This priority application is incorporated by reference in its entirety.

FIELD OF THE INVENTION

The present invention relates to a hot plate for supporting heated elements above a more heat susceptible surface, and, more particularly, to a hot plate having a transparent or translucent main body together with the additional feature of a photographic element or other means for illustrating an object mounted or positioned on the undersurface of the main body so as to be visible therethrough.

BACKGROUND DISCUSSION

Hot plates are used to protect linoleum countertop surfaces and the like from hot cooking utensils taken off of a stove burner or out of an oven. Photographs and the like are often mounted behind glass sheets through use of peripheral frame structures. Such photographs often show vivid landscapes or loved ones. To Applicant's knowledge there has not existed, until the present invention, a single device which has provided both the function of providing a protective hot plate and a permanent or integral mounting surface for photographs or other displays. This is likely due to the harsh heat environment associated with hot plates (e.g., high temperature cooking utensils and occasional dishwasher treatment). Conventional hot plates typically include a solid, tempered, shatterproof glass plate with an adhered backing layer of vinyl or the like. Conventional hot plates also include a hill and valley contoured surface to help in heat dissipation.

SUMMARY OF THE INVENTION

The present invention achieves the advantage of providing a single device that functions not only as a hot plate but also as a photograph or other image display mounting element. In so doing, the present invention features a first hot plate assembly having a transparent or at least translucent top plate formed of a tempered glass capable of withstanding high temperatures. The hot plate assembly of the present invention also features a backing layer adhered to the bottom surface of the top plate with an adhesion material which remains transparent upon drying and is capable of handling large heat fluctuations such as the adhesive material utilized on automobile windshield decals. In view of the high heat and large liquid contact, a more heat resistant and less soluble adhesive is also contemplated to prolong the life of the hot plate assembly. Elastomeric tabs are also adhered or otherwise joined to the backing layer and/or bottom of the top plate to extend therebelow so that the top plate is spaced above the surface being protected.

In one embodiment of the invention, a photograph is positioned between the backing layer and the bottom surface of the top plate such that the image is viewable through to the upper, mounting surface of the top plate. The photograph preferably is smaller in size than the top plate and positioned such that a border of backing layer, which is adhered directly to the top plate, extends about the photograph's periphery. The present invention also contemplates the additional application of an adhesive between the front of the photograph and the contacting bottom surface of the top plate and/or between the backing layer and the back surface of the photograph. The cardboard like material of the photograph can be of a conventional type which has proven suitable for use in the present invention's new environment. Alternatively, the material supporting the photographic image can be enhanced from the stand point of greater heat resistance such as through the use of a modified, more heat resistant photographic paper material known in the paper industry. Alternatively, a non-paper material can also be utilized.

In one embodiment of the invention the mounting surface of the top plate has a hill-and-valley contoured arrangement to facilitate heat dissipation. Additional embodiments of the invention include the coordinated positioning of non-contoured mounting surface sections with contoured mounting surface sections to place the non-contoured sections in alignment with the intended positioning of the image below. In this way, the image is more visible while the contoured sections both function to help in heat dissipation as well as framing the image for better eye focusing.

In an alternate embodiment of the invention, the image is mounted directly on or forms part of the material forming the top plate and/or the backing layer. For example, the image can be silk screened directly on to the bottom surface of the top plate or sprayed on by a manipulated ink jet sprayer prior to the application of the backing layer to the bottom surface of the top plate. The backing layer can have the adhesive preapplied (e.g., protected by a protective layer which is peeled off just prior to application on to a take up roller or removed manually) or the adhesive can be applied just before application of the backing layer. As another example, the image can be applied directly to the surface of the backing layer which is to come in contact with the top plate and the adhesive can be either applied before the application of the image to the backing surface or after the image is applied. In yet another embodiment, the image can be integrally formed in the manufacture of the backing layer (as are automobile windshield decals). Moreover, the glass itself can be integrally formed with dies or pigments or the like to depict certain images. These latter two techniques are less preferable, however, then the earlier described embodiments as they typically do not provide the image clarity of the other techniques and also are less flexible from the standpoint of switching to other images including personalized images.

The present invention also features an apparatus for automated production of the hot plate assemblies which involves scanning a desired image and directly applying the scanned image to the backing layer or bottom of the top plate prior to applying the backing layer to the top plate. Also, a control unit can be used to coordinate the movement of a feeding conveyor, the ink jet sprayer, feed rollers, heaters, etc. to achieve a quick assembly line production of the hot plate assemblies. The scanner technique also provides for easy conversion from one image to another such as the storing of several images in a data base and inputting the number of desired images in each production sequence. The scanning production apparatus can also be provided with a single hot plate mount rather than a continuous feed conveyor system which is well suited for customers presenting a single photo or the like for scanning and personalizing of a hot plate.

BRIEF DESCRIPTION OF THE PREFERRED EMBODIMENTS

The advantageous aspects of the invention will be more fully appreciated from the following description, particularly when considered in conjunction with the attached drawings, wherein;

FIG. 3 illustrates a cross-sectional view taken along cross-section line III—III in FIG. 1;

FIG. 4 illustrates a cutaway of that which is shown in FIG. 3;

FIG. 5 illustrates a side elevational view of that which is shown in FIG. 1;

FIG. 6 shows an expanded cut-away view similar to that which is shown in FIG. 3;

FIG. 7 shows a cross-sectional view similar to that of FIG. 3 except for an alternate embodiment.

FIG. 10 shows a schematic view of one embodiment of a manufacturing apparatus for producing the apparatus of FIG. 1.

DETAILED DESCRIPTION OF THE PREFERRED EMBODIMENTS

Figure 1:
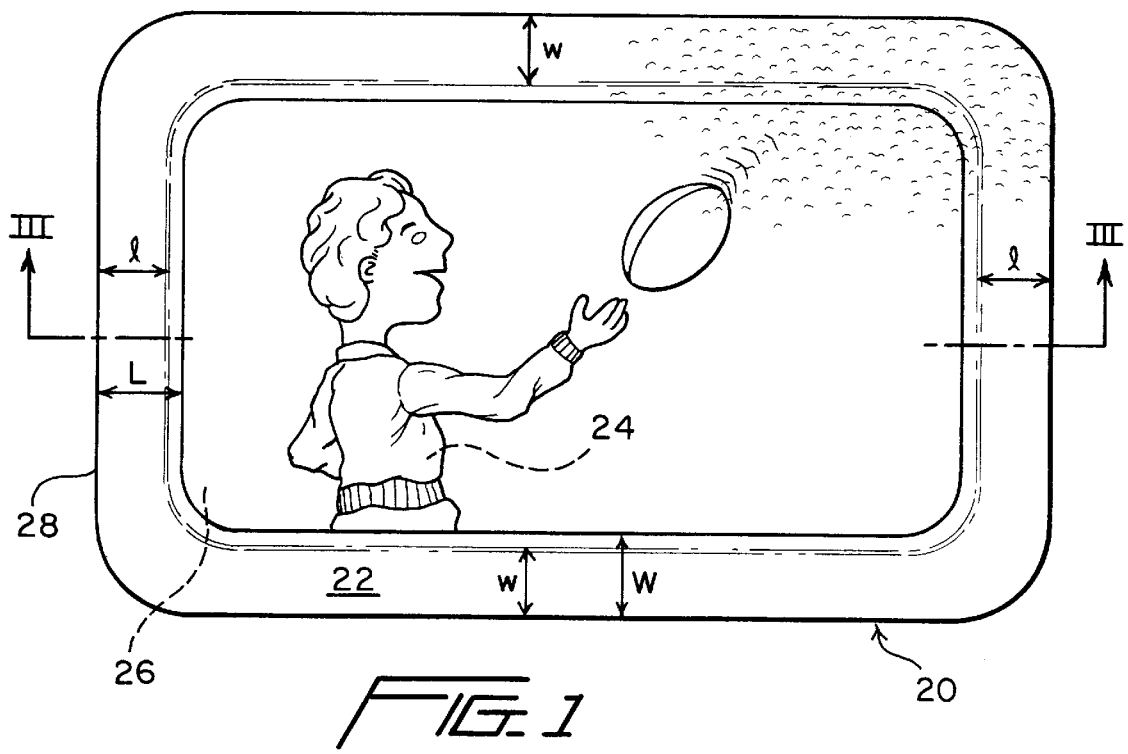
FIG. 1 illustrates a top plan view of a preferred embodiment of the invention.

FIG. 1 illustrates a top plan view of a preferred embodiment of the present invention. As shown in FIG. 1, hot plate assembly 20 includes an upper top plate 22 which is transparent or translucent such that image 24 is completely or at least partially visible therethrough. Top plate 22 is preferably formed of a tempered, impact resistant, and/or shatter proof glass material. The upper surface of the top plate has a contoured configuration over its entire surface. (Only a representative sample of the contour is shown in FIG. 1 for draftsman convenience.) This facilitates heat dissipation. However, the contoured surface still allows image 24 to be viewed. The plate can also be made essentially smooth over its entire surface, however.

FIG. 1 also illustrates hot plate assembly 20 having a generally rectangular configuration with rounded corners. Image 24 is, in this embodiment, a photograph 26 on photograph paper. Photograph 26 is centered with respect to outer periphery 28 and has a similarly configured periphery to that of top plate 22. The edges of photograph 26 is spaced a distance L and W away from periphery 28.

Figure 2:
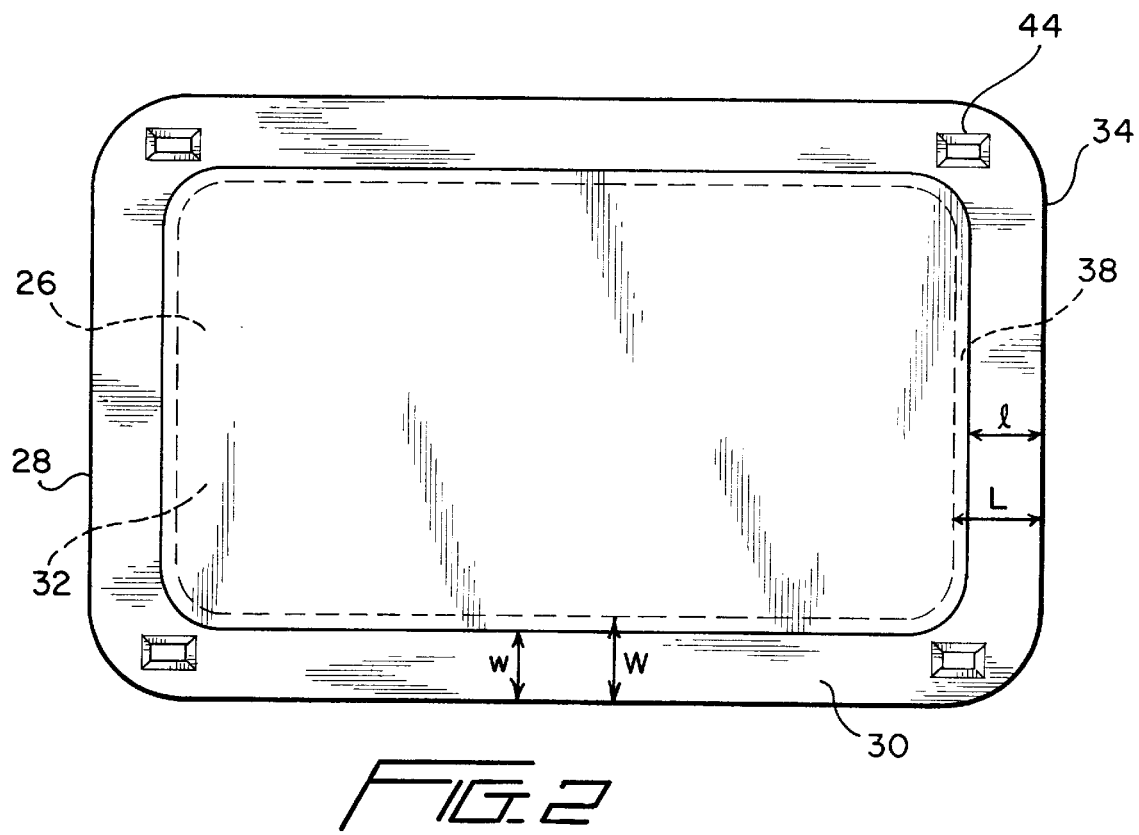
FIG. 2 illustrates a bottom plan view of that which is shown in FIG. 1.

With reference now to FIGS. 1 and 2, backing layer 30, which is formed of vinyl or a similar flexible plastic material, is shown attached to top plate 22. Backing layer 30 is adhered about periphery 28 at least a distance w and 1 inward from periphery 28. In a preferred embodiment, backing layer 30 is adhered, as well, to back surface 32 of photograph 26.

FIG. 3 illustrates a cross-sectional view taken along cross-section line III—III . Preferably backing layer 30 has peripheral edge 34 which is commensurate with peripheral edge 28 of top plate 22. At step 36, which exists due to the difference in height between the photograph and plate brought about by the thickness of the cardboard-like photographic paper forming photograph 26, there is formed open space 38. While it is desirable to minimize the open space 38, the difference in height inevitably leads to some degree of interruption in the adhesion interaction between the backing layer 30 and the back, relatively smooth bottom surface of top plate 22. The inclusion of added adhesive in this area could be used to compensate but is procedurally difficult to accomplish. The open space 38 is shown in FIGS. 2 and 3 as having a length of L-l and a width of W-w.

The photograph can be of any size with respect to the cutting board so long as there is sufficient space (e.g., 1 inch or 2.54 cm) between the entire periphery of the picture and the corresponding outer edge of the top plate to ensure that backing layer 30 remains fixed in position with respect to top plate 22. Also in a preferred embodiment, the adhesive backed vinyl backing layer 30 has adhesive essentially over its entire surface so that it fixes picture 26 in position so that it does not slide in open space 38.

FIG. 4 shows an expanded view of an intermediate portion of the cross-section in FIG. 3. As shown in FIG. 4, picture 26 is in direct contact with back surface 42 of top plate 22. If desired, an additional degree of securement of picture 22 can be achieved by applying an adhesive to the front face of picture 26 which adhesive is of the type that remains transparent for prolonged periods of time despite a high heat environment.

FIG. 4 illustrates another preferred manner of attachment that relies on adhesive layer 40 which can be of any type of adhesive which is compatible with the glass top plate 22 and typically vinyl backing layer 30 as well as the photographic paper and which securely adheres despite the high heat environment. The adhesive currently used to attach the vinyl backing layer to top plate in conventional hot plates is suitable for most applications of the present invention. Any adhesive which is water resistant and able to withstand relatively high heat and remain essentially transparent can be relied upon. Suitable adhesives include both thermoplastic and thermosetting adhesives such as those that fall in the vinyl or acrylic resins class as well as cellulose adhesives.

FIGS. 2 and 3 further illustrate hot plate assembly 20 as comprising mounting pads 44 which achieve both the function of spacing top plate 22 off from the more heat susceptible underlying surface and providing non-scratch points of contact due to their being formed of an elastomeric material such as rubber or plastic.

FIGS. 5 and 6 illustrate an alternate embodiment of the present invention wherein rather than a photograph, the image is mounted directly to the contacting surface of backing layer 30 either before or after a glue application to that layer or directly to the bottom surface of the top plate 22. The direct mounting can be achieved in any suitable manner. Possible methods include a silk screening operation or a printing operation such as one which uses an ink jet printing head positioned over the surface to which the image is to be affixed. As illustrated in FIGS. 5 and 6, backing layer 30 is parallel and in contact with the bottom surface across its entire surface. Image 24 is thus mounted either directly to the bottom surface of the top plate or to the contacting surface of backing layer 30 and is also visible through top plate 22.

FIG. 7 illustrates a cross-sectional view similar to that of FIG. 3 for a different embodiment of the invention wherein peripheral edge 34 of backing layer 30' does not extend all the way to the periphery of top plate 22 and photograph 26' is spaced further inward from edge 28 then in the embodiment of FIG. 1. In the FIG. 7 embodiment, mounting members 44 are adhered directly to the bottom surface of plate 22 rather than to the bottom surface of backing layer 30.

Figure 8:
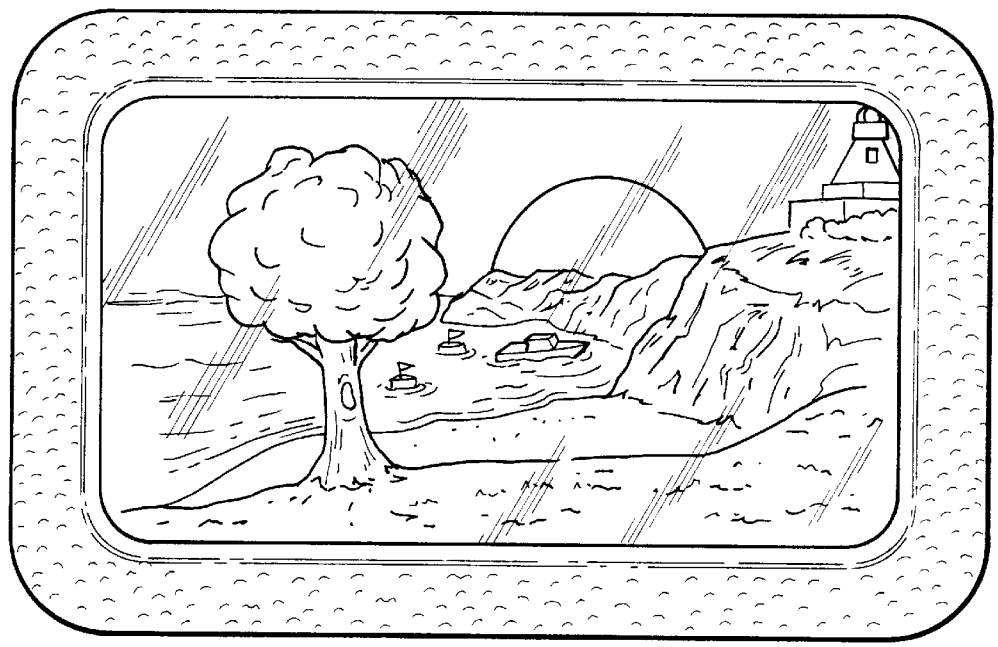
FIG. 8 shows a top plan view of an alternate embodiment of the invention.
Figure 9:
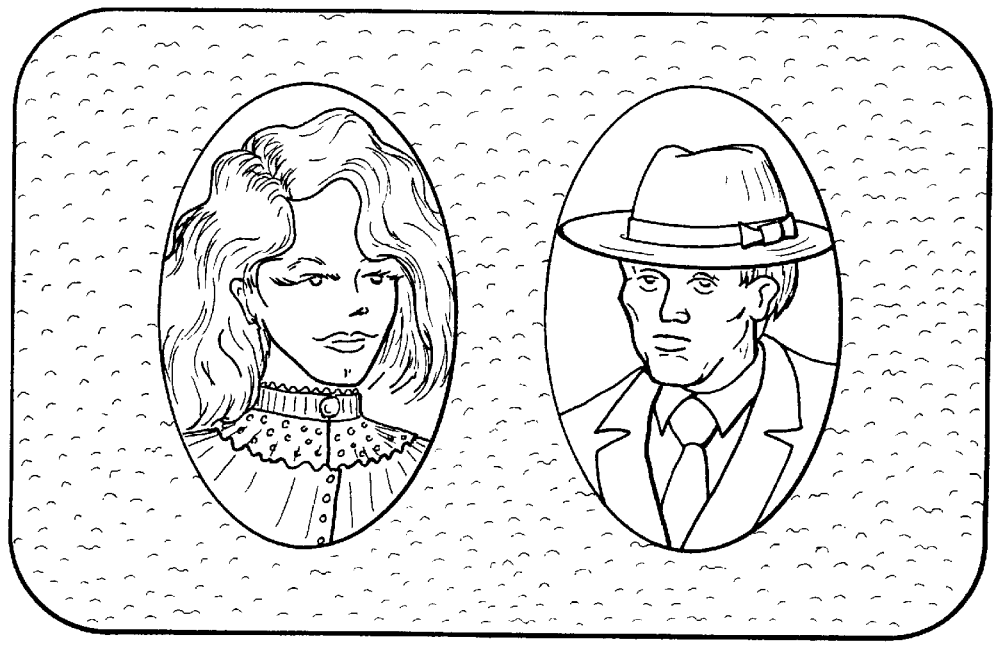
FIG. 9 shows a top plan view of an additional alternate embodiment of the present invention.

FIGS. 8 and 9 illustrate two alternate embodiments of the invention wherein the top surface of the top plate includes both contoured section(s) (e.g. a hill and valley arrangement) and non-contoured section(s) which are arranged so as to position the clearer non-contoured section (s) of the top plate in alignment with the image or photograph provided below the top plate. This arrangement also helps highlight the image by providing a surrounding frame appearance. Also, as illustrated in FIG. 9 at least in some embodiments the heat dissipation function is still applicable for typical sized hot plate supported objects.

FIG. 10 illustrates apparatus 100 used in producing hot plate assemblies such as those shown in FIGS. 5 and 6. In the manufacturing assembly shown in FIG. 10, top plates 22 are mounted top face down on conveyor 102 between alignment ribs (including either length and/or width tabs or complete, correspondingly sized rectangular flexible rings). Scanner unit 104 is provided in the system such that photograph or image 26 can be fed therein and the converted image data is conveyed to printer head 106 which in this preferred embodiment is separate from the scanner and is a multicolor ink jet type printer (or some form of multi-color paint sprayer) which reconverts the data signals received from the scanner to recreate a copy of the image on to continuous backing layer 108. Backing layer 108 is fed from source roller 110 over support 112 and around tensioning roller 114 and down to application roller 116 which pushes sheet 108 against the back side of top plate 22 passing underneath.

FIG. 10 illustrates glue applying assembly 118 positioned above plates 22 and upstream of application roller 116. Assembly 118 sprays a layer of glue which remains transparent following hardening. The point of application of printer head 106 is sufficiently upstream so that the ink (or paint) sufficiently dries prior to contacting plate 22 with its still tacky adhesive. If desired a heater can be positioned so as to facilitate drying between these locations. Positioned downstream of application roller 116 is backing layer definer 120. Definer 120 includes a heated wire configured in the shape of the periphery of the top plate so that excess backing layer material can be separated (e.g. manually) after the definer is lifted and conveyor 102 reactivated. Depending on the type of adhesive utilized, an additional heater can be provided to set the adhesive (e.g part of definer 120 or with roller 116).

Microprocessor control unit 122 is in communication with items 102, 104, 106, 110 and/or 114 (feed roller), 118 such that each is activated in the appropriate sequence. For example, the number of images generated from the scanner to be placed in spaced series on backing layer 108 can be inputted while the print spraying and glue spraying are timed in conjunction with the forwarding of conveyor 102 so that the adhesive is applied to a plate positioned below and the images are appropriately spaced on backing layer 108 so as to be centered on each plate at the time roller 116 places the two in contact.

In an alternate embodiment of the invention the print head is positioned where glue applier 118 is shown in FIG. 10 so that the image is applied directly to the bottom of plate 22 and the glue application is provided at the location where ink jet head 106 is presently shown. Alternatively the backing layer can have preapplied adhesive when loaded on roller 110 (with or without a protective backing layer which can be pulled off with a powered take up roller). Also rather than a conveyor assembly a single, fixed mount can be provided wherein the operator would insert and remove a plate after each application. This latter arrangement would be well suited for allowing for customers to personalize their hot plate assembly by bringing a personal picture which is scanned and then applied to the back of the top plate or to the backing layer which backing layer is then appropriately affixed to the top plate. In yet another embodiment, the image can be applied to the backing layer at one location and then provided in roll form (e.g., with a protective layer) and mounted in a system such as FIG. 10 only free of the scanner and ink jet head.

Although the present invention has been described with particular embodiments, it is intended that the invention not be limited to the specific details of those embodiments. Various substitutions and modifications will occur to those of ordinary skill in the art following a review of the above described embodiments exemplifying the present invention, and all such modifications are intended to fall within the spirit and scope of this invention.

What is claimed is:

1. A hot plate assembly, comprising:
    a top plate formed of a heat resistant material that is transparent or translucent, said top plate having an upper contact surface and a back surface; and
    a depiction which is mounted with respect to said top plate so as to be viewable through said transparent or translucent top plate, and wherein said top plate is formed of tempered glass.

2. A hot plate assembly as recited in claim 1 further comprising a photograph which includes said depiction and means for securing said photograph to the back surface of said top plate.

3. A hot plate assembly as recited in claim 2 further comprising a backing layer which is bonded directly to an exposed area of the back surface of said top plate not covered by said photograph and which forms at least a component of said means for securing said photograph.

4. A hot plate assembly as recited in claim 3 wherein the exposed area extends about the periphery of said photograph and said backing layer is adhesively bonded to both said exposed area and to said photograph.

5. A hot plate assembly as recited in claim 4 wherein said backing layer is a vinyl sheet that covers essentially in entirety said back surface.

6. A hot plate assembly as recited in claim 3 wherein said photograph includes an adhesive layer which bonds said photograph to said back surface.

7. A hot plate assembly as recited in claim 1 wherein said contact surface is contoured.

8. A hot plate assembly as recited in claim 7 wherein said contact surface includes contoured and non-contoured sections with at least one contoured section, from a viewing standpoint, framing said depiction.

9. A hot plate assembly as recited in claim 1 further comprising a plurality of mounts spaced about the periphery of said back surface so as to provide a heat dissipation space between said back surface and an underlying surface supporting said hot plate assembly.

10. A hot plate assembly as recited in claim 1 further comprising a backing layer, and said backing layer having said depiction formed thereon or therein and an adhesive layer which secures said backing layer to the back surface of said top plate.

11. A hot plate assembly as recited in claim 10 wherein said backing layer covers essentially in its entirety the back surface, and said depiction covers all but a border region of the back surface of said top plate.

12. A hot plate assembly as recited in claim 1 wherein said depiction is formed directly on said back surface and said hot plate assembly further comprising a backing layer which covers over said depiction so as to provide a protective covering.

13. A hot plate assembly as recited in claim 12 wherein said depiction is an ink or paint depiction applied to said back surface.

14. A hot plate assembly, comprising:

a transparent or translucent heat dissipating material top plate;

an image member which is a photograph;

a backing layer secured to an underside of said top plate so as to sandwich said photograph between said backing layer and said top plate such that an image provided by the photograph is viewable through said top plate.

15. A hot plate assembly as recited in claim 14 wherein said photograph occupies a smaller area than said backing layer such that an adhesive layer of said backing layer is directly bonded to the underside of said top plate about a border region surrounding the photograph.

16. A hot plate assembly as recited in claim 15 wherein said backing layer is a flexible plastic sheet and said hot plate assembly further comprising a plurality of mounts spaced about the periphery of said top plate so as to provide a heat dissipation space between the underside of said top plate and a hot plate assembly support surface contacted by said mounts.

17. A hot plate assembly as recited in claim 14 wherein said top plate has an upper contact surface which includes at least one hill and valley contoured section which, from a viewing standpoint, frames an image presented by said image member.

18. A hot plate assembly as recited in claim 14 wherein said heat dissipating top plate is a tempered glass top plate.

19. A method of forming hot plate assembly of claim 1, comprising:

providing the depiction to an undersurface of said transparent or translucent top plate which is formed of tempered glass such that an image provided by said depiction is viewable through said top plate; and mounting said depiction with a backing layer by securing said backling layer to said top plate.

20. A method as recited in claim 19 wherein providing said depiction includes providing a photograph on photographic paper and covering said depiction includes adhering a flexible sheet of material to said top plate with the flexible sheet extending external to an external peripery of the photograph.

\* \* \* \* \*